United States Patent
Jain et al.

(10) Patent No.: US 11,960,823 B1
(45) Date of Patent: *Apr. 16, 2024

(54) MISSING GLYPH REPLACEMENT SYSTEM

(71) Applicant: Adobe Inc., San Jose, CA (US)

(72) Inventors: Ashish Jain, Ashok Vihar (IN); Arushi Jain, Ashok Vihar (IN)

(73) Assignee: Adobe Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/984,656

(22) Filed: Nov. 10, 2022

(51) Int. Cl.
*G06F 40/166* (2020.01)
*G06F 40/279* (2020.01)

(52) U.S. Cl.
CPC .......... *G06F 40/166* (2020.01); *G06F 40/279* (2020.01)

(58) Field of Classification Search
CPC .............................. G06F 40/166; G06F 40/279
USPC .......................................................... 715/256
See application file for complete search history.

(56) References Cited

U.S. PATENT DOCUMENTS

| | | | | |
|---|---|---|---|---|
| 4,680,710 A * | 7/1987 | Kizilbash | ................ | G06F 3/018 |
| | | | | 178/30 |
| 7,702,182 B2 * | 4/2010 | Nolan | .................. | G06V 30/262 |
| | | | | 382/284 |
| 7,802,184 B1 * | 9/2010 | Battilana | ............... | G06F 40/274 |
| | | | | 715/256 |
| 7,937,658 B1 * | 5/2011 | Lunde | .................... | G06F 40/109 |
| | | | | 715/256 |
| 8,782,550 B1 * | 7/2014 | Patridge | ................ | G06F 40/166 |
| | | | | 715/702 |
| 10,636,387 B2 * | 4/2020 | Imms | ....................... | G09G 5/28 |
| 11,809,806 B2 | 11/2023 | Jain et al. | | |
| 2004/0088657 A1 * | 5/2004 | Brown | .................. | G06F 40/109 |
| | | | | 715/264 |
| 2004/0189666 A1 * | 9/2004 | Frisken | ................... | G06T 17/00 |
| | | | | 345/611 |
| 2008/0004860 A1 * | 1/2008 | Fux | ........................ | G06F 40/279 |
| | | | | 704/2 |
| 2008/0079730 A1 * | 4/2008 | Zhang | ................... | G06F 40/126 |
| | | | | 345/468 |
| 2010/0275161 A1 | 10/2010 | Dicamillo et al. | | |
| 2013/0027406 A1 * | 1/2013 | Liu | ....................... | G06F 40/109 |
| | | | | 382/218 |

(Continued)

OTHER PUBLICATIONS

MergeGlyphs; Nov. 20, 2020; glyphsapp.com; pp. 1-5.*

(Continued)

*Primary Examiner* — Andrew R Dyer
(74) *Attorney, Agent, or Firm* — FIG. 1 Patents

(57) ABSTRACT

A missing glyph replacement system is described. In an example, a Unicode identifier of a missing glyph is obtained and glyph metadata describing a glyph cluster that includes the Unicode identifier is obtained from a cache maintained in the storage device, e.g., as part of preprocessing. From this, the system obtains glyphs from the font using Unicode identifiers included in the glyph cluster. The system uses a representative glyph from these glyphs to verify the glyph cluster, and if verified obtains glyphs based on the cluster. For these obtained glyphs, an amount of similarity is determined for the missing glyph with respect to the plurality of obtained glyphs, e.g., to control output of representations of the obtained glyphs in the user interface. The representations are user selectable via the user interface to replace the missing glyph.

20 Claims, 10 Drawing Sheets

(56) References Cited

U.S. PATENT DOCUMENTS

| | | | | |
|---|---|---|---|---|
| 2013/0151957 | A1* | 6/2013 | Kuroiwa | G06F 40/268 |
| | | | | 715/256 |
| 2014/0164352 | A1 | 6/2014 | Denninghoff | |
| 2014/0195903 | A1 | 7/2014 | Kaasila et al. | |
| 2015/0067488 | A1* | 3/2015 | Liu | G06F 40/166 |
| | | | | 715/268 |
| 2015/0332491 | A1* | 11/2015 | Dwivedi | G06F 18/22 |
| | | | | 345/636 |
| 2017/0322913 | A1* | 11/2017 | Kukreja | G06F 3/0236 |
| 2017/0323007 | A1* | 11/2017 | Kukreja | G06F 16/58 |
| 2018/0129408 | A1* | 5/2018 | Aradilla | G06F 3/0236 |
| 2019/0050559 | A1 | 2/2019 | McCarty et al. | |
| 2019/0243875 | A1* | 8/2019 | Jain | G06V 30/418 |
| 2020/0012811 | A1* | 1/2020 | Walters | G06F 16/248 |
| 2020/0311059 | A1* | 10/2020 | Kamata | G06V 30/414 |
| 2021/0019366 | A1* | 1/2021 | Markey | G06F 40/126 |
| 2021/0049326 | A1* | 2/2021 | Amend | G06F 40/232 |
| 2021/0224465 | A1* | 7/2021 | Dhanuka | G06F 40/109 |
| 2021/0287029 | A1* | 9/2021 | Hashimoto | G06F 40/106 |
| 2022/0253871 | A1* | 8/2022 | Miller | G06F 40/279 |
| 2023/0008785 | A1 | 1/2023 | Jain et al. | |

OTHER PUBLICATIONS

Glyphs file extension; Aug. 11, 2020; file-extensions.org; pp. 1-2.*

Miyazaki et al.; Automatic Generation of Typographic Font From Small Font Subset; Feb. 2020; IEEE Computer Graphics and Applications; arXiv:1701.05703; pp. 99-111.*

Xu et al.; Automatic Generation of Artistic Chinese Calligraphy; Jun. 2005; IEEE Intelligent System; pp. 32-39.*

Yiu et al.; Chinese Character Synthesis Using Metapost; 2003; TUGboat; vol. 24; No. 1—Proceedings of the 2003 Annual Meeting; pp. 85-93.*

Zong et al.; StrokeBank: Automating Personalized Chinese Handwriting Generation; 2014; Association for the Advancement of Artificial Intelligence; 6 Pages.*

Jain, Arushi , "US Application as Filed", U.S. Appl. No. 17/368,419, filed Jul. 6, 2021, 52 pages.

U.S. Appl. No. 17/368,419 , "Corrected Notice of Allowability", U.S. Appl. No. 17/368,419, dated Oct. 5, 2023, 2 pages.

U.S. Appl. No. 17/368,419 , "Notice of Allowance", U.S. Appl. No. 17/368,419, dated Aug. 18, 2023, 8 pages.

* cited by examiner

MISSING GLYPH REPLACEMENT SYSTEM

BACKGROUND

A glyph is a symbol that defines an appearance or form for a character, e.g., a letter, a number, a symbol, and so forth. Fonts are configurable to include a wide range of glyphs, from a few hundred to a few thousand individual characters. Chinese and Japanese fonts, for instance, typically include over ten-thousand glyphs. Differences in which glyphs are supported by respective fonts introduces a technical challenge of "missing glyphs." Digital content, for instance, generated using a set of glyphs from a particular font may include glyphs that are not supported by another font. This causes the digital content system in conventional techniques to employ empty spaces or use missing glyph representations, thereby introducing visual artifacts and giving an appearance of errors in the digital content.

SUMMARY

A missing glyph replacement system is described. In an example, a Unicode identifier of a missing glyph is obtained and glyph metadata describing a glyph cluster that includes the Unicode identifier is obtained from a cache maintained in the storage device, e.g., as part of preprocessing. From this, the system obtains glyphs from the font using Unicode identifiers included in the glyph cluster. The system uses a representative glyph from these glyphs to verify the glyph cluster, and if verified obtains glyphs based on the cluster. For these obtained glyphs, an amount of similarity is determined for the missing glyph with respect to the plurality of obtained glyphs, e.g., to control output of representations of the obtained glyphs in the user interface. The representations are user selectable via the user interface to replace the missing glyph.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
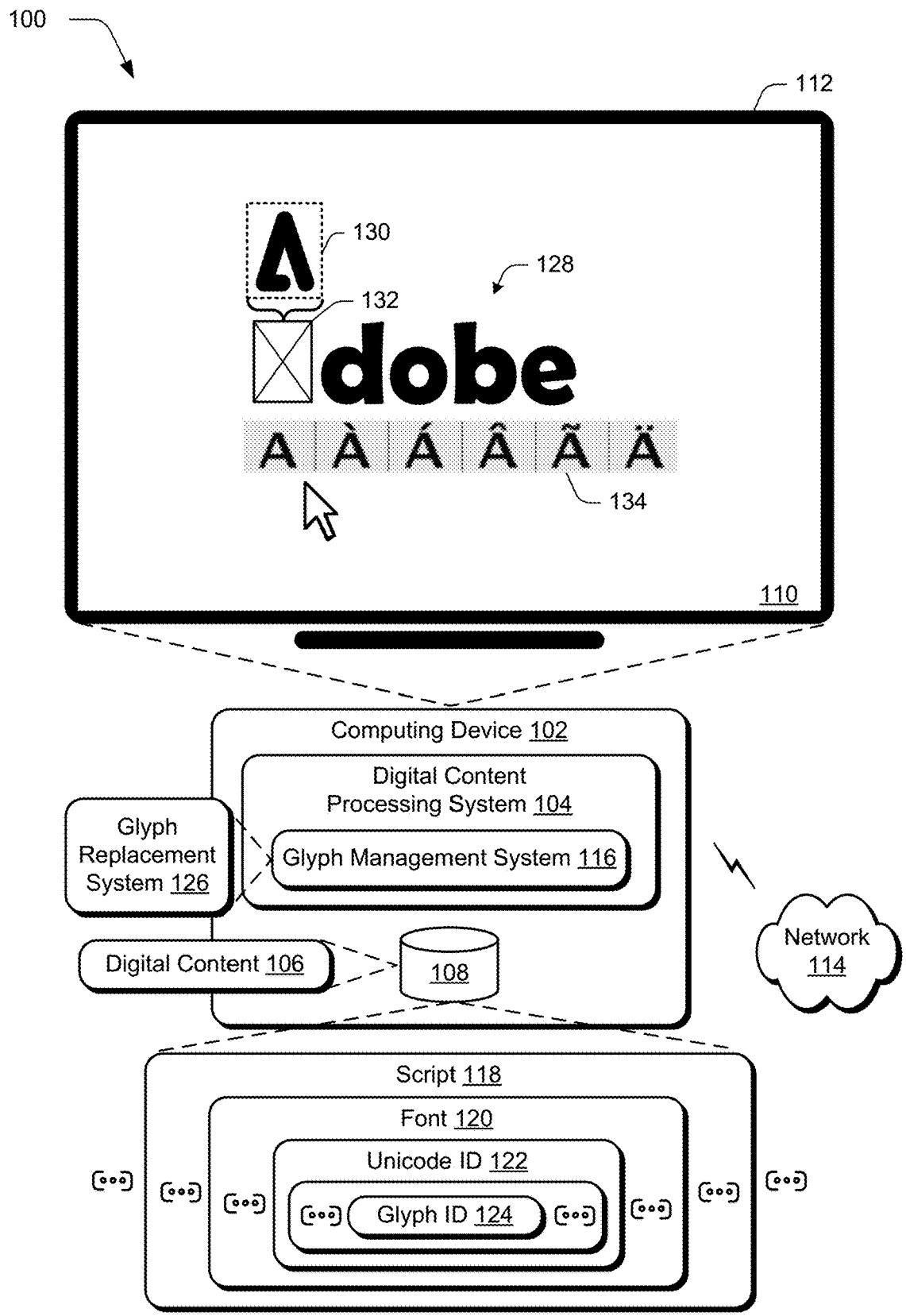
FIG. 1 is an illustration of an environment in an example implementation that is operable to employ missing glyph replacement techniques described herein.

Differences in glyphs supported by respective fonts of a digital content processing system results in a "missing glyph" problem. This is caused when a glyph for a font used to generate digital content is not supported by another font that is subsequently used to render the digital content. In conventional techniques, whenever a glyph is not included as part of a font, digital content processing systems either use a blank space or a missing glyph representation, e.g., an open rectangle, a rectangle with an "X" through it, and so forth. This introduces visual artifacts which in some instances are difficult to locate, e.g., for digital documents having significant amounts of text.

Accordingly, missing glyph replacement techniques are described as implemented by a digital content processing system to improve user efficiency and computational resource consumption in missing glyph replacement. These techniques overcome the challenges of conventional techniques that involve manual search of fonts that contain a missing glyph, manual search of alternative versions of a missing glyph within a same font, and so forth.

In one example, preprocessing techniques are employed in which a base font is used to determine similarity of glyphs within the base font to each other. Glyph metadata that describes this similarity is cached in a storage device and used during runtime to increase efficiency in locating similar glyphs, e.g., to be used as a replacement for a missing font. As a result, computational efficiency of computing devices that leverage these techniques is improved along with corresponding increases in user interaction efficiency in accessing replacement glyphs even for fonts that have not been previously encountered by the digital content processing system.

To do so in one example, a glyph management system receives an input selecting a script, e.g., Latin, Greek, etc. In response, a plurality of fonts is obtained that correspond to the selected script. From this, a base font is chosen from the plurality of fonts by the system. This is performable in a variety of ways, such to select the base font based on a number of distinct Unicode identifiers in order to maximize the number of Unicode identifiers that are to be used for preprocessing.

Glyph clusters are then formed from glyphs included in the base font. To begin, the glyph management system initiates generation of initial (i.e., candidate) glyph clusters for distinct Unicode identifiers included in the base font. Alternatives of those glyphs that have the same Unicode identifiers (e.g., but different glyph identifiers) are also assigned to corresponding initial glyph clusters. A representative glyph is then generated for each of the candidate glyph clusters, e.g., as an average of glyphs assigned to respective glyph clusters for those clusters that are assigned more than one glyph.

The glyph management system then combines clusters based on similarity of the representative glyphs to each other, e.g., which exhibit at least a threshold amount of similarity to each other. This process continues over a number of iterations to combine and recombine glyph clusters and corresponding generation and regeneration of the representative glyphs. This is performed until a final collection of glyph clusters is formed that are assigned glyphs that have at least a threshold amounts of similarity to each other. A result of this is used to generate glyph metadata describing the glyph clusters that includes the Unicode identifiers of respective glyphs from the base font assigned to the clusters. The glyph metadata is cached in a storage device for use at runtime by the glyph management system.

At runtime, the glyph management system detects a missing glyph. Text generated using a first font, for instance, is converted for display using a second font. However, in this instance a glyph supported by the first font is not supported by the second font. In response, the glyph management system detects the missing glyph. In one example, this is performed automatically and without user intervention, e.g., upon detecting the glyph is not included in the second font and is thus "missing." In another example, an input is received that is generated through user interaction with a user interface, e.g., by selecting a missing glyph representation. A variety of other examples are also contemplated.

In response, a Unicode identifier of the missing glyph is detected by the glyph management system. Glyph metadata describing a glyph cluster that includes the Unicode identifier is obtained from the cache maintained in the storage device that was preprocessed as described above. Thus, the glyph metadata for the glyph cluster includes Unicode identifiers of glyphs assigned to that cluster for the base font.

From this, the glyph management system obtains glyphs from the second "new" font corresponding to the glyph selected above using the Unicode identifiers. A representative glyph is computed by the glyph management system from these glyphs that correspond to the glyph cluster, e.g., as an average. The glyph management system then verifies the glyph cluster formed from the second font by comparing the missing glyph to the glyph representation using a similarity threshold. If the missing glyph has a similarity distance with respect to the glyph representation that is within an amount defined by a similarity threshold, then the missing glyph is verified as being sufficiently visually similar to the glyph cluster. If the verification fails, this process is repeated individually for each of the glyphs from the second font to form a set of glyphs that are visually similar to the glyph, e.g., using the above similarity threshold. Thus, this determination and subsequent processing is not performed unless the glyphs obtained from the second font based on the Unicode IDs from the base font for the identified cluster are not visually similar, thus conserving computational resources and supporting real time operation by a computing device.

For these obtained glyphs (whether obtained from the glyph cluster when sufficiently similar or for other glyphs), an amount of similarity (e.g., similarity distance) is determined for the missing glyph with respect to the plurality of obtained glyphs, respectively. These amounts are then used to order the plurality of obtained glyphs to control output of representations of the obtained glyphs in the user interface, e.g., as a predefined number of representations, as an ordered list, and so on. The representations are user selectable via the user interface to replace the missing glyph representation in this example with corresponding glyphs depicted using the representations. In this way, use of a base font as part of preprocessing and caching supports real time operation across types of fonts in real time, even in instances of first impression with those fonts and thus are applicable to a wide range of fonts as these fonts are developed. Further discussion of these and other examples is included in the following sections and shown using corresponding figures.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Digital Medium Environment

FIG. 1 is an illustration of a digital medium environment 100 in an example implementation that is operable to employ missing glyph replacement techniques described herein. The illustrated environment 100 includes a computing device 102, which is configurable in a variety of ways.

The computing device 102, for instance, is configurable as a desktop computer, a laptop computer, a mobile device (e.g., assuming a handheld configuration such as a tablet or mobile phone), and so forth. Thus, the computing device 102 ranges from full resource devices with substantial memory and processor resources (e.g., personal computers, game consoles) to a low-resource device with limited memory and/or processing resources (e.g., mobile devices). Additionally, although a single computing device 102 is shown, the computing device 102 is also representative of a plurality of different devices, such as multiple servers utilized by a business to perform operations "over the cloud" as described in FIG. 10.

The computing device 102 is illustrated as including a digital content processing system 104. The digital content processing system 104 is implemented at least partially in hardware of the computing device 102 to create, process and transform digital content 106, which is illustrated as maintained in a storage device 108 of the computing device 102. Such processing includes creation of the digital content 106, modification of the digital content 106, and rendering of the digital content 106 in a user interface 110 for output, e.g., by a display device 112. Examples of digital content 106 include webpages, digital documents, user interfaces as output through execution of an application, and so forth. Although illustrated as implemented locally at the computing device 102, functionality of the digital content processing system 104 is also configurable as whole or part via functionality available via the network 114, such as part of a web service or "in the cloud."

An example of functionality incorporated by the digital content processing system 104 to process the digital content 106 is illustrated as a glyph management system 116. Scripts 118 correspond to collections of letters, numbers, and symbols, e.g., Latin, Greek, and so on. Accordingly, scripts 118 include a multitude of fonts 120, which is a set of the letters, numbers, and symbols of the script in a particular style and size. Glyphs are elemental symbols with respective fonts 120 corresponding to individual instances of the letters, numbers, and symbols in the particular style and size for the font. The glyphs are identifiable using a respective Unicode identifier (ID) 122, i.e., Unicode value. Unicode is a standard used to promote consistent encoding, representation, and management of the letters, numbers, and symbols of glyphs across different types of fonts 120. Glyph identifiers (ID) 124 are used to identifying different glyphs corresponding to a same Unicode ID 122, e.g., a base glyph and alternative glyphs.

As previously described, fonts 120 are configurable to include tens of thousands of glyphs, support for which varies between different fonts 120 which results in a "missing glyph" scenario. However, conventional techniques used to address this scenario are challenging and prone to error.

Figure 9:
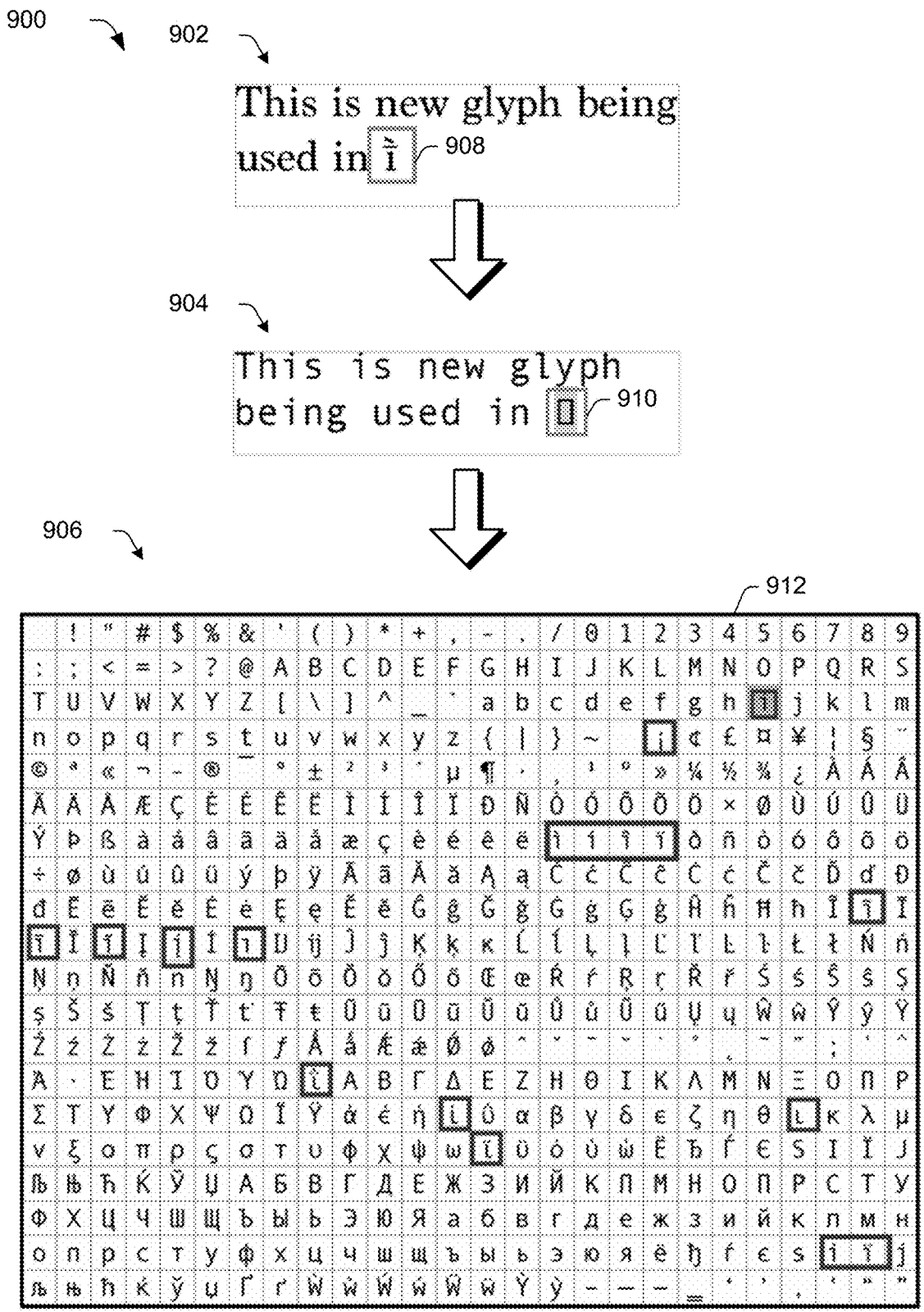
FIG. 9 depicts an example of missing glyphs and candidate replacement glyphs for a font.

FIG. 9, for instance, depicts an example implementation 900 of a missing glyph which is illustrated using first, second, and third stages 902, 904, 906. At the first stage 902, glyphs are displayed for a first font "Marion," which includes a glyph 908 that is particular to that first font. At the second stage 904, the first font is changed to a second font of "Andale Mono" which does not support the glyph 908 and therefore is a "missing glyph." Existence and placement of the missing glyph is indicated as part of the text using a missing glyph representation 910.

The second font 912 includes visually similar glyphs (depicted as outline in respective boxes) as shown at the third stage 906 that are usable to replace the missing glyph 908. Conventional techniques to do so, however, involve manual navigation and selection through the glyphs, which is inefficient and result in inaccuracies, e.g., caused when a user in this manual technique does not locate visually similar glyphs due to confusion caused by a multitude of available glyphs even for a single font.

Accordingly, the glyph management system 116 employs a glyph replacement system 126 to support efficient replacement of missing glyphs. As shown in the illustrated user interface 110 of FIG. 1, text 128 includes use of a glyph 130 depicted as a stylized "A" which is not supported by a particular font used to render the text 128. This causes output of a missing glyph representation 132 by the glyph replacement system 126.

A user input is received via the user interface 110 that selects the missing glyph representation 132. In response, the glyph replacement system 126 causes output of other glyphs 134 in that font 120 that are usable to replace the missing glyph 130, automatically and without user intervention. The other glyphs 134 are selected that are visually similar to the missing glyph 130, and through inclusion in that same font 120 promote visual consistency in the digital content 106. In this way, the glyph replacement system 126 overcomes technical challenges of conventional systems to replace missing glyphs. Other examples are also contemplated, including automated detection and replacement of missing glyphs as further described below.

Further, these techniques are configured to improve operational efficiency and computational resource consumption by leveraging a similarity determination of which glyphs are visually similar using a base font that is then employed to locate corresponding similar glyphs in other fonts. As a result, the glyph management system 116 improves operational and user efficiency in interacting with thousands of glyphs for thousands of different fonts for a variety of different scripts. Further discussion of operation of the glyph management system 116 and glyph replacement system 126 including preprocessing and runtime is included in respective sections in the following discussion and shown using corresponding figures.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Glyph Preprocessing Techniques

Figure 2:
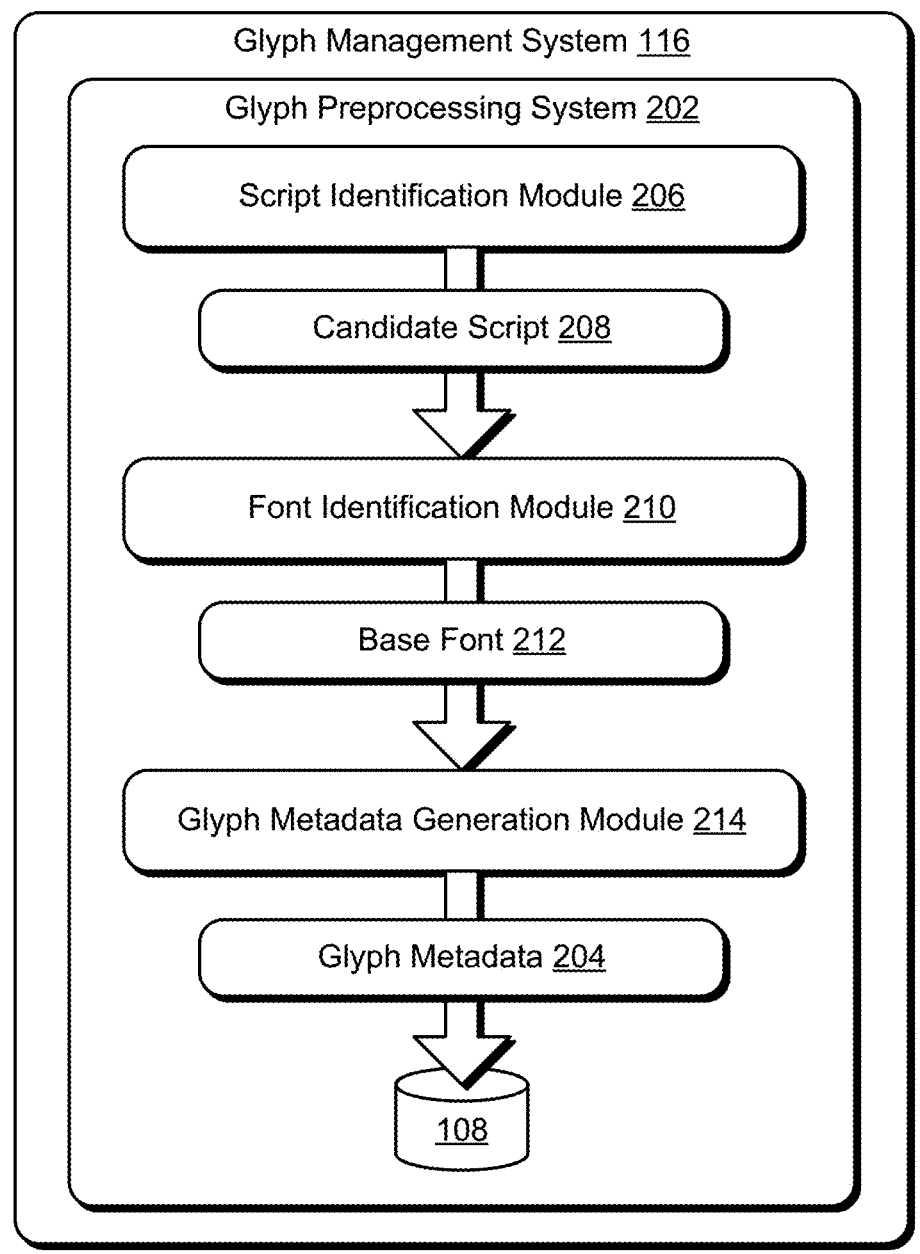
FIG. 2 depicts an example system of a glyph management system of FIG. 1 as including a glyph preprocessing system for generating glyph metadata for a base font of a script.
Figure 3:
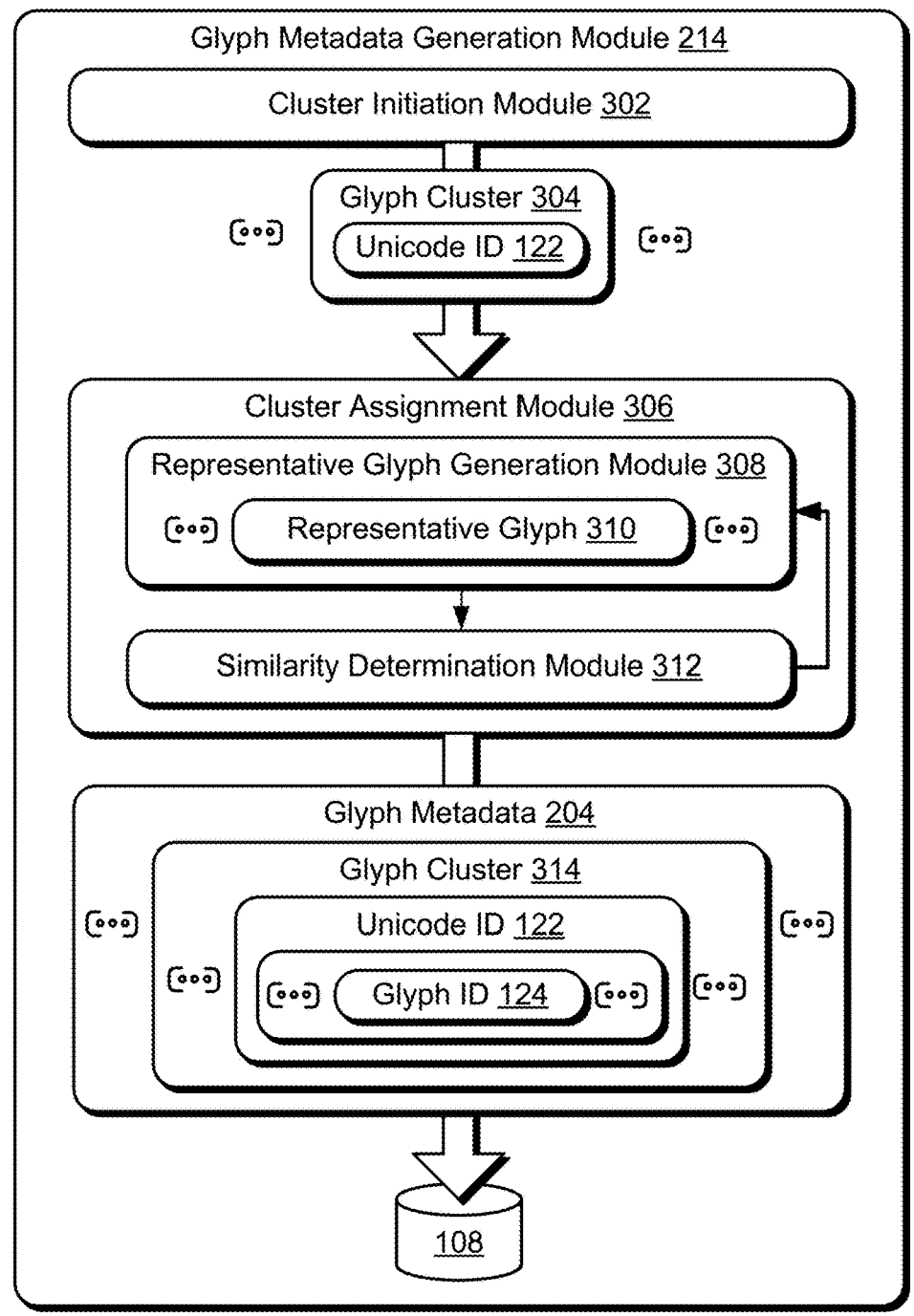
FIG. 3 depicts an example system showing operation of a glyph metadata generation module of the glyph processing system of FIG. 2 in greater detail.
Figure 4:
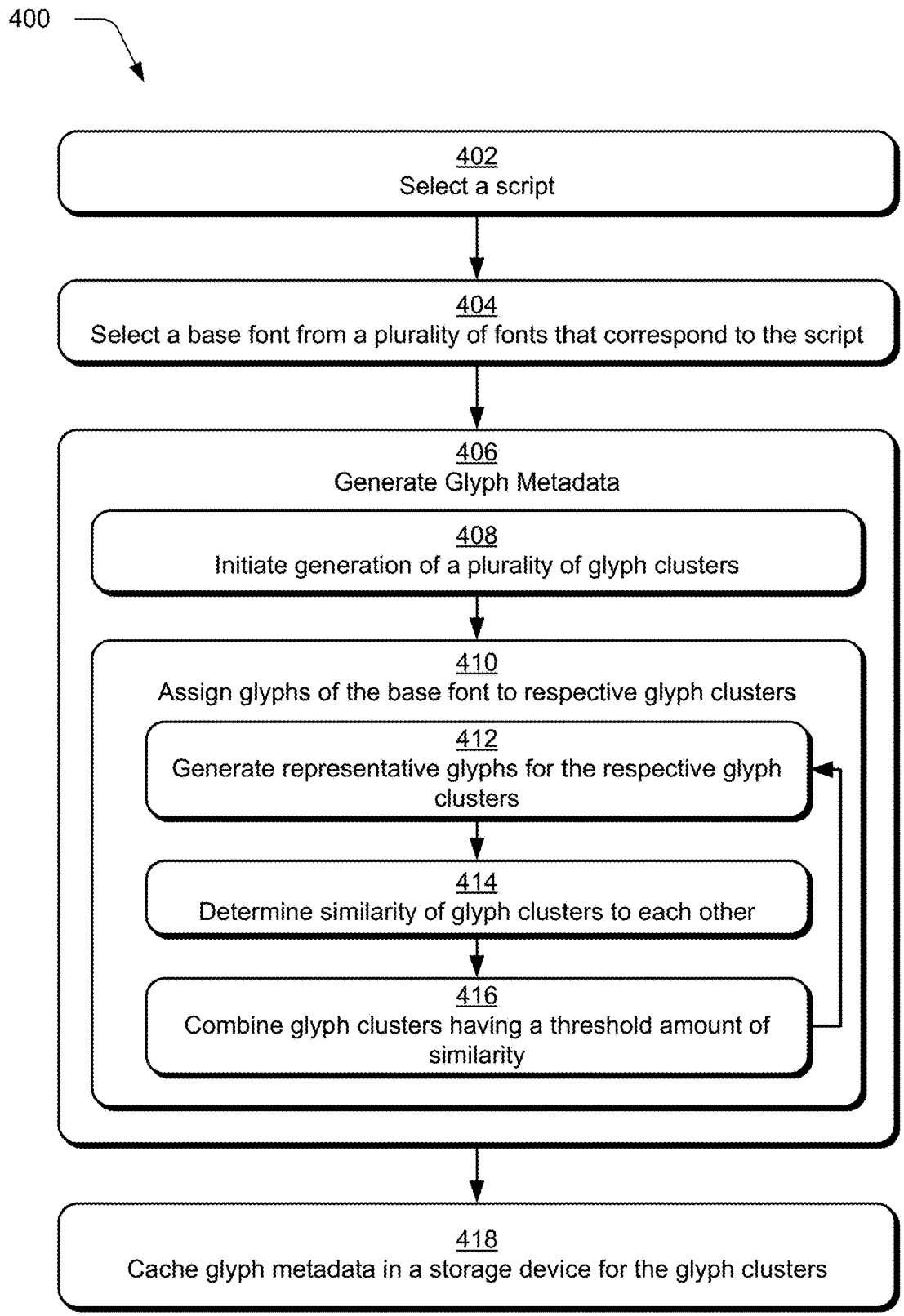
FIG. 4 is a flow diagram depicting a procedure in an example implementation of glyph metadata generation.
Figure 5:
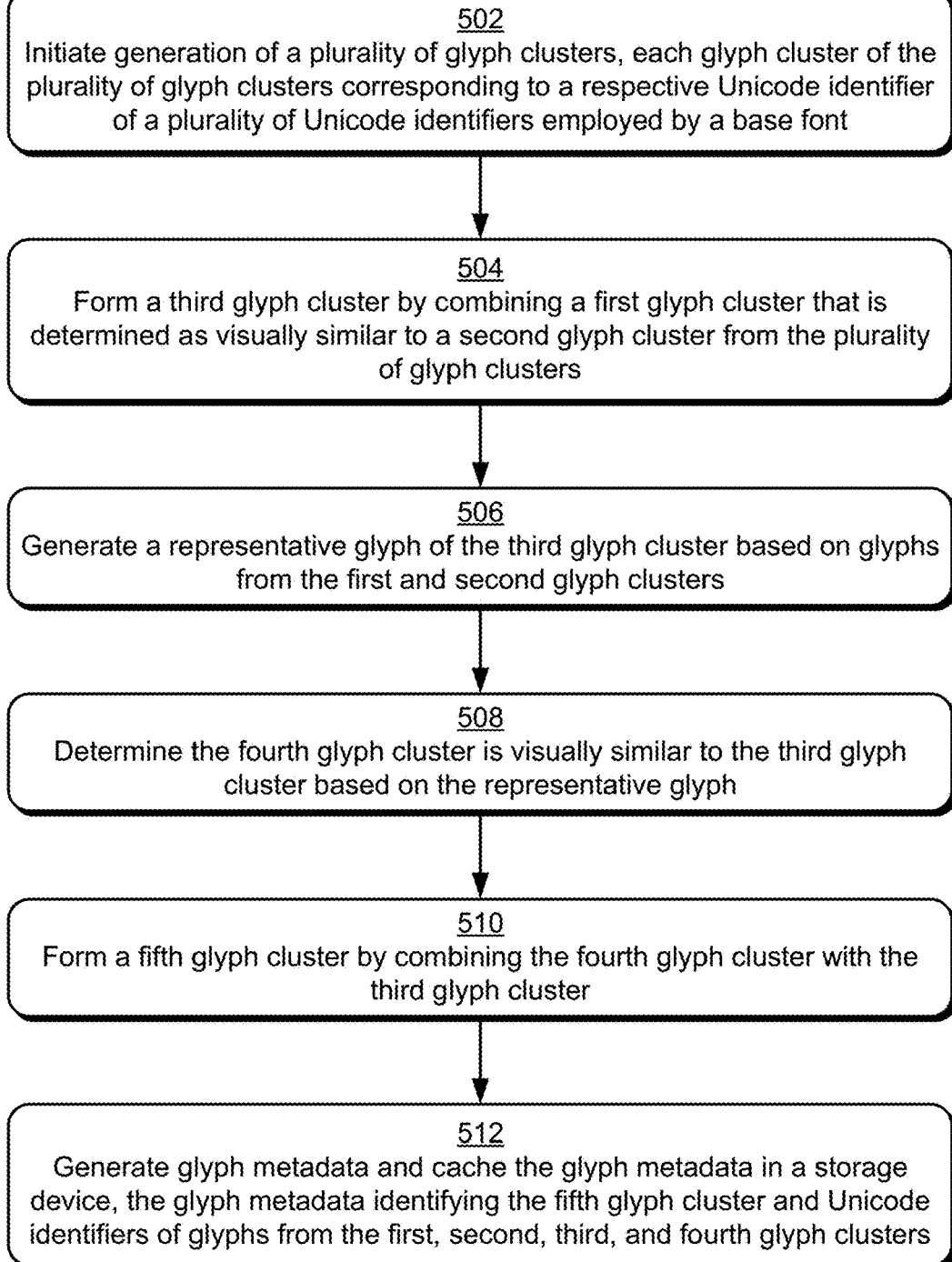
FIG. 5 is a flow diagram depicting a procedure in an example implementation of glyph clustering as part of preprocessing glyph metadata.

FIG. 2 depicts an example system 200 of the glyph management system 116 of FIG. 1 as including a glyph preprocessing system for generating glyph metadata for a base font of a script. FIG. 3 depicts an example system 300 showing operation of a glyph metadata generation module of the glyph processing system in greater detail. FIG. 4 depicts a procedure 400 in an example implementation of glyph metadata generation. FIG. 5 depicts a procedure 500 in an example implementation of glyph clustering as part of preprocessing glyph metadata.

The following discussion describes techniques that are implementable utilizing the previously described systems and devices. Aspects of each of the procedures are implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-5.

The glyph management system 116 includes a glyph preprocessing system 202 that is configured to generate glyph metadata 204 to be cached in a storage device 108 for use at runtime. This supports real time operation during runtime and conserves computational resources of the computing device 102 through performance "offline."

To begin, a script identification module 206 selects a candidate script 208 (block 402) from a plurality of scripts 118. In one instance, this is performed automatically and without user intervention by the script identification module 206 by identifying which scripts are maintained and/or supported locally by the computing device 102, e.g., in a storage device 108. In another instance, a user input is received via the user interface 110 to select the candidate script 208, e.g., from a plurality of options displayed in the user interface 110.

A font identification module 210 is then employed to select a base font 212 from a plurality of fonts 120 that correspond to the candidate script 208 (block 404). As before, this is performable in a variety of ways. In one example, the font identification module 210 selects the base font 212 by examining fonts 120 that are accessible locally at the computing device 102. The candidate font 212 is selected from the plurality of fonts 120 by the font identification module 210 that has a highest number (i.e., maximum number) of instances of Unicode IDs 122. This promotes processing of a maximum number of distinct glyphs as the base font 212. Other examples are also contemplated, such as responsive to a user input specifying the base font 212 from the plurality of fonts 120.

Glyph metadata 204 is then generated (block 406) by a glyph metadata generation module 214 for the base font 212, an example of which is depicted in greater detail with respect to FIG. 3. In this example, a cluster initiation module 302 initiates generation of a plurality of glyph clusters 304 (block 408). The cluster initiation module 302, for instance, assigns base glyphs having Unicode IDs 122 that are distinct, one to another, within the base font 212 to form respective glyph clusters 304, e.g., from a priority queue to respective clusters.

Additional glyphs of the Unicode IDs 122 from the base font 212 are also assigned from the priority queue to respective glyph clusters (block 410) by the cluster initiation module 302. Alternatives of those glyphs (e.g., having a same Unicode ID but different Glyph ID), for instance, are added to respective glyph clusters 304 by the cluster initiation module 302 to arrive at an initial set of glyph clusters 304 having one or more glyphs with a same Unicode ID 124. Thus, at this point each of the initial glyph clusters 304 corresponds to a single respective Unicode ID 122 but may have multiple glyph IDs 124.

A cluster assignment module 306 is then employed by the glyph metadata generation module 214 to combine visually similar glyph clusters. In the illustrated example, a representative glyph generation module 308 is implemented to generate a representative glyph 310 (block 412), e.g., for those glyph clusters 304 that have been assigned more than one glyph. The representative glyph 310 is formed as an average of the glyphs assigned to the respective glyph cluster 304, e.g., from respective vector representations. In instances in which a single glyph is assigned to the glyph cluster, that glyph is the representative glyph.

A similarity determination module 312 is then employed to determine an amount of similarity of the glyph clusters 304 to each other (block 414). This determination is based on the representative glyphs 310, whether "generated" as an average of multiple glyphs or for "stand alone" glyphs as described above. The similarity determination module 312 is then configured to determine visual similarity of the representative glyphs to each other. A variety of techniques are usable by the similarity determination module 312 to do so, examples of which include a comparison of vector representations of the glyphs, cosine similarity, earth mover's distance similarity, kernel density estimation, and so forth.

Glyph clusters 304 are then combined that have at least a threshold amount of similarity (block 416) to each other. This is based on a similarity threshold that specifies a similarity distance defining which glyphs are considered to be visually similar and which are not. This process continues over a number of iterations. This includes generation of representative glyphs 310 for those glyph clusters that have been combined and subsequent similarity determinations until the glyph clusters 314 are formed that are visually similar as defined by the similarity threshold.

From this, glyph metadata 204 is generated and cached in a storage device 108 that describes the glyph clusters 314 (block 418). The glyph metadata 204, for instance, is arranged accordingly to glyph cluster 314 and has Unicode IDs 122 of glyphs from the base font 212 that have been assigned to that cluster as visually similar to each other. Thus, the glyph cluster 314, in some instances, references base glyphs for Unicode IDs 122 that are visually similar and glyph IDs 124 of alternative glyphs as well. This process is repeated for other scripts 118 such that each script includes glyph metadata 204 for a corresponding base font 212. Thus, each script 118 is used to generate glyph metadata 204 for a single respective base font 212 thereby conserving memory resources of the computing device 102 as this is not performed for each font 120 available at the computing device 102.

In the example procedure 500 of FIG. 5, for instance, generation of a plurality of glyph clusters is initiated in which each glyph cluster of the plurality of glyph clusters 304 corresponds to a respective Unicode identifier (ID) of a plurality of Unicode IDs 122 employed by a base font 212 (block 502). A third glyph cluster is formed by combining a first glyph cluster that is determined as visually similar to a second glyph cluster from the plurality of glyph clusters (block 504), e.g., using a similarity threshold as described above. A representative glyph of the third glyph cluster is generated based on glyphs from the first and second glyph clusters (block 506) as an average of those glyphs.

A determination is then made at a subsequent iteration that a fourth glyph cluster is visually similar to the third glyph cluster based on the representative glyph (block 508) generated for the third glyph cluster. In response to this determination, a fifth glyph cluster is formed by combining the fourth glyph cluster with the third glyph cluster (block 510) and more particularly glyphs that make up those clusters.

Glyph metadata 204 is generated and cached in a storage device 108 that identifies the fifth glyph cluster and Unicode identifiers of glyphs from the first and second glyph clusters (which together form the third glyph cluster) as well as glyphs from the fourth glyph cluster (block 512). In this way, use of the representative glyphs 310 conserves consumption of computational resources by permitting a single determination of similarity, as opposed to determining similarity between each of the glyphs of the base font 212 to each other, which is computationally prohibitive when confronted with the thousands of glyphs that may be available even for a single font. The glyph metadata 204 is maintained in a storage device and accessed during runtime as further described in the following section.

Missing Glyph Runtime Techniques

Figure 6:
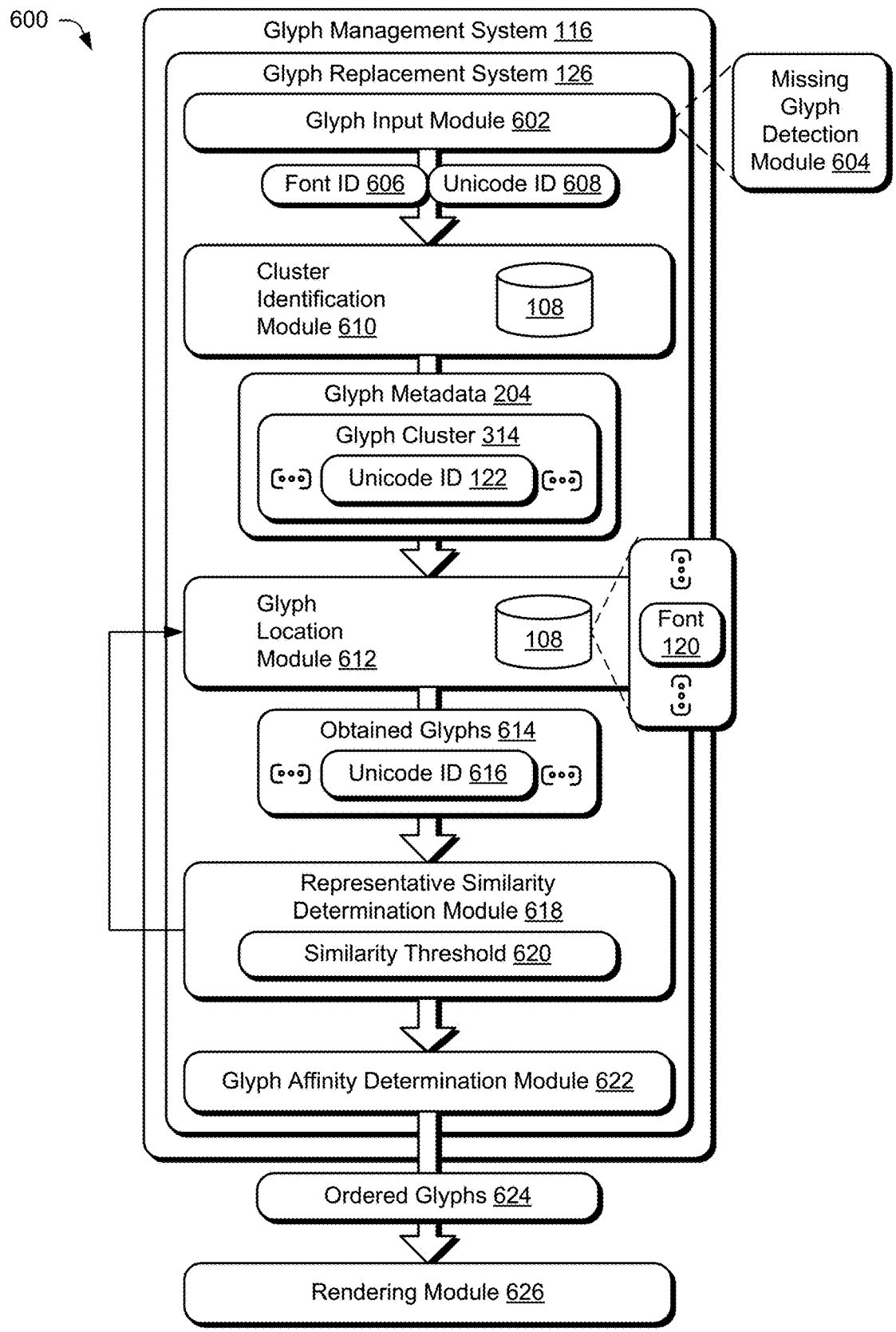
FIG. 6 depicts an example system of the glyph management system of FIG. 1 as including a glyph similarity system to determine and output similar glyphs at runtime by leveraging cached glyph metadata.
Figure 7:
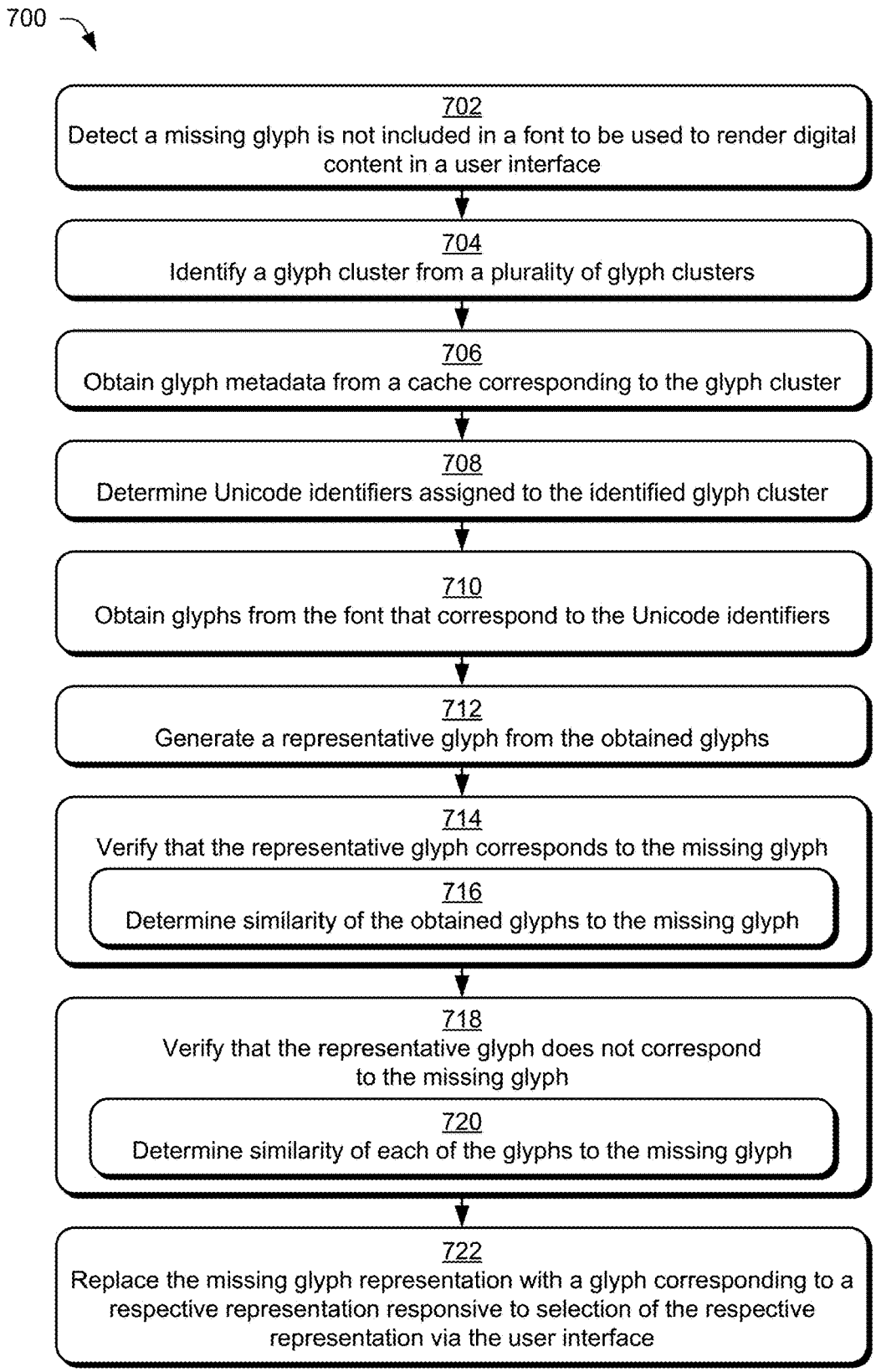
FIG. 7 is a flow diagram depicting a procedure in an example implementation of missing glyph detection, similarity determination, and replacement in real time.
Figure 8:
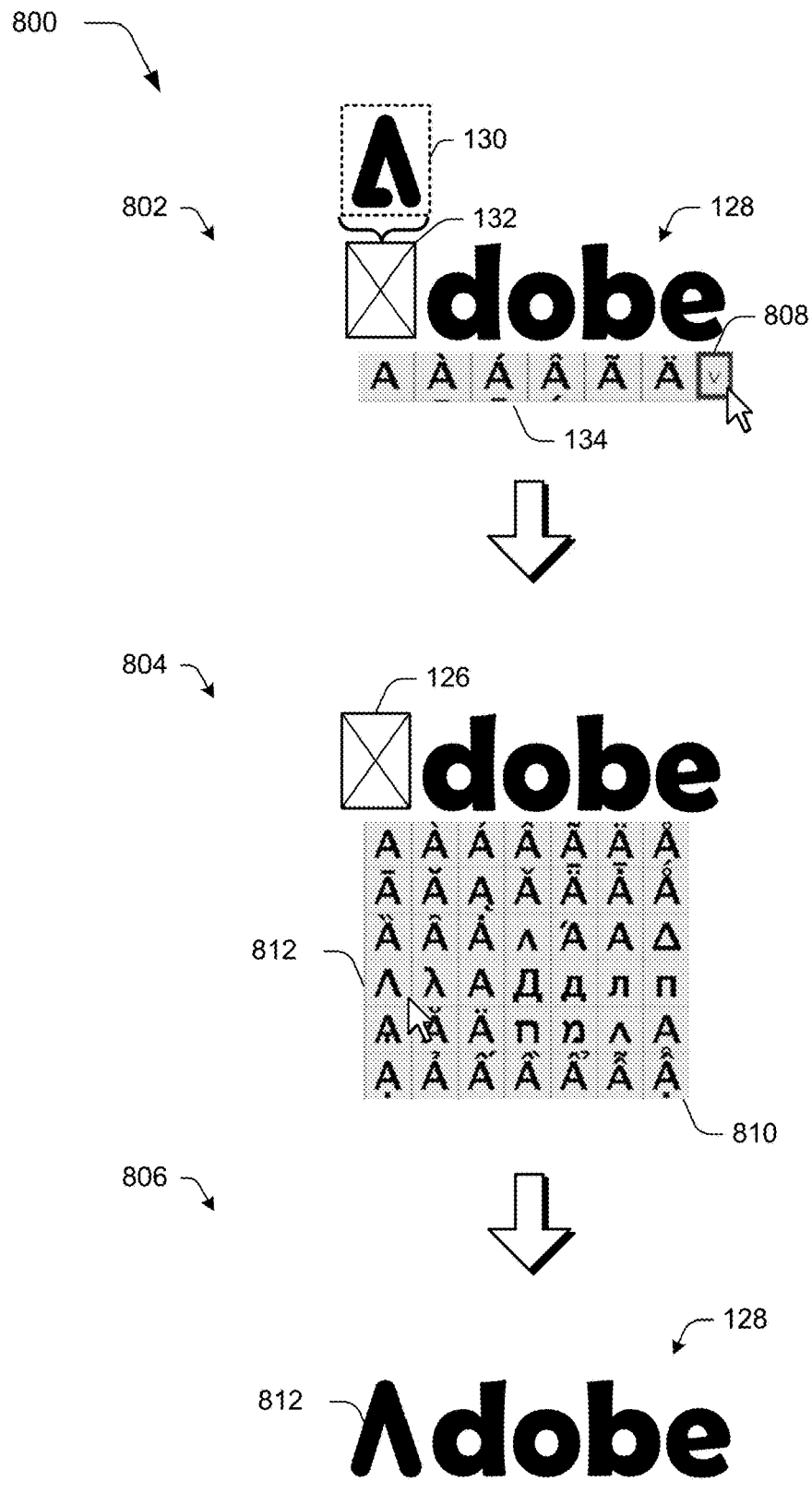
FIG. 8 depicts an example implementation of output and replacement of a missing glyph in a user interface.

FIG. 6 depicts an example system 600 of the glyph management system of FIG. 1 as utilizing the glyph replacement system to replace a missing glyph at runtime by leveraging cached glyph metadata. FIG. 7 depicts a procedure 700 in an example implementation of missing glyph detection, similarity determination, and replacement in real time. FIG. 8 depicts an example implementation 800 of output of a missing glyph representation and replacement using similar glyphs in a user interface 110.

The following discussion describes techniques that are implementable utilizing the previously described systems and devices. Aspects of each of the procedures are implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 6-10.

To begin, a glyph input module 602 employs a missing glyph detection module 604 to detect a missing glyph as not included in a font to be used to render digital content in a user interface (block 702). The glyph input module 602, for instance, receives an input via the user interface 110 as selecting a missing glyph representation 132, e.g., as a "right click," gesture, and so forth. In another instance, the missing glyph identification module 604 detects presence of the missing glyph, automatically and without user intervention. Text as described in relation to FIG. 9, for example, is converted from a first font to a second font. As part of this conversion, the missing glyph detection module 604 detects the missing glyph as not supported by the second font. In response, at least one replacement glyph is located by the glyph replacement system 126 based on a font ID 606 of the second font to be used to render the text as well as a Unicode ID 608 of the missing glyph 130.

The Unicode ID 608 is then passed as an input to a cluster identification module 610. The cluster identification module 610 is configured to identify a glyph cluster 314 (block 704) that corresponds to the Unicode ID 608 from glyph metadata 204 maintained in a cache in a storage device 108. The glyph cluster 314, for instance, includes Unicode IDs 608 that have been determined as visually similar for the base font 212 as described in the previous section.

Therefore, the Unicode ID 608 of the missing glyph 130 is used to locate a glyph cluster 314 having that Unicode ID. Glyph metadata 204 that corresponds to the glyph cluster 314 is then obtained from the cache (block 706) and the cluster identification module 610 determines which Unicode identifiers, if any, are also assigned to the glyph cluster (block 708). Thus, the glyph cluster 314 is used to locate additional Unicode identifiers that have been determined as having glyphs that are visually similar, one to another, through preprocessing of the base font 212 as described in the previous section.

The Unicode IDs 122 of the glyph cluster 314 identified from the glyph metadata 204 are then passed as an input to a glyph location module 612. The glyph location module 612 first locates a font 120 corresponding to the font ID 606 of the second font, i.e., the font 120 used to render the now missing glyph. The glyph location module 612 then obtains glyphs (i.e., obtained glyphs 614) from the located font 120 having Unicode IDs 616 identified from the glyph metadata 204 (block 710), e.g., as maintained in a storage device 108 of the computing device 102.

A representation similarity determination module 618 is utilized by the glyph replacement system 126 to generate a representative glyph from the obtained glyphs 614 (block 712), e.g., through use of techniques described in relation to the representative glyph generation module 308 with respect to FIG. 4. This is performed, for instance, as an average of vector representation of the obtained glyphs 614. The representative similarity determination module 618 then verifies whether the representative glyph is visually similar to the missing glyph 130 input by the glyph input module 602 based on a similarity threshold 620, e.g., has a similarity distance less than the similarity threshold 620.

In an instance in which the representative glyph is verified as corresponding to the missing glyph (block 714) the representative similarity determination module 618 is implemented to determine amounts of similarity of the obtained glyphs 614 to the missing glyph 130 (block 716), respectively. Thus, in this instance the amount of similarity is determined for each of the obtained glyphs 614 with respect to the missing glyph 130 is performed responsive to successful verification.

In another instance in which the representative glyph is not verified by the representative similarity determination module 618 as corresponding to the missing glyph 130 (block 718), the glyph location module 612 obtains each of the glyphs from the font 120, i.e., the obtained glyphs 614 include glyphs from other clusters for the font 120. The representative similarity determination module 618 then determines similarity of each of these obtained glyphs 614 to the missing glyph 130 (block 720) and from this selects a subset as being similar to the missing glyph 130. The subset, for instance, includes a predefined number of the glyphs based on similarity in a ranked order, have at least a threshold amount of similarity, and so on.

In this way, the glyph management system 116 conserves computational resources of the computing device 102 by first determining whether the obtained glyphs 614 for the glyph cluster 314 are visually similar. If so, respective amounts of similarity (e.g., similarity distance) to those obtained glyphs 614 is determined and if not, respective amounts of similarity are determined for each of the glyphs of the font 120.

The glyphs from the font 120 that have been determined as visually similar to the missing glyph 130 are then passed to a glyph affinity determination module 622. The glyph affinity determination module 622 is configured to generate ordered glyphs 624 based on respective amounts of visual similarity to the missing glyph 130. The ordered glyphs 624 are then passed as an input in this example to a rendering module 626 for rendering in a user interface 110.

FIG. 8 depicts an example of selecting of a missing glyph, output of candidate replacement glyphs, and glyph replacement using first, second, and third stages 802, 804, 806. At the first stage 802, text 128 includes use of a glyph 130 depicted as a stylized "A" that is not supported by a particular font used to render the text 128. This causes output of a missing glyph representation 132 by the glyph replacement system 126.

The glyph replacement system 126 in this example, upon detection of the missing glyph 130, causes output of other glyphs 134 in that font 120 that are usable to replace the missing glyph 130, automatically and without user intervention. The other glyphs 134 are selected that are visually similar to the missing glyph 130 as described above.

In the illustrated example, the other glyphs 134 are output as part of a menu of initial options for replacement of the missing glyph 130 (and the missing glyph representation 132), which includes a predefined number (e.g., top six) of representations of glyphs from the ordered glyphs 624. The menu includes an option 808 that is user selectable to expand the menu as shown at the second stage 804 to display additional representations.

At the second stage 804, an expanded menu 810 is output and a user input is received as selecting a representation 812 of another glyph that is to function as a replacement for the missing glyph 130. In response, the missing glyph representation 132 is replaced with the replacement glyph corresponding to the respective representation (block 722). Other techniques are also usable to initiate this process, such as a context menu that is output via a "right click" of a cursor control device. In this way, the techniques and system described herein improve computational and user efficiency in missing glyph replacement over conventional techniques and as such improve operation of the underlying computing device 102.

Example System and Device

Figure 10:
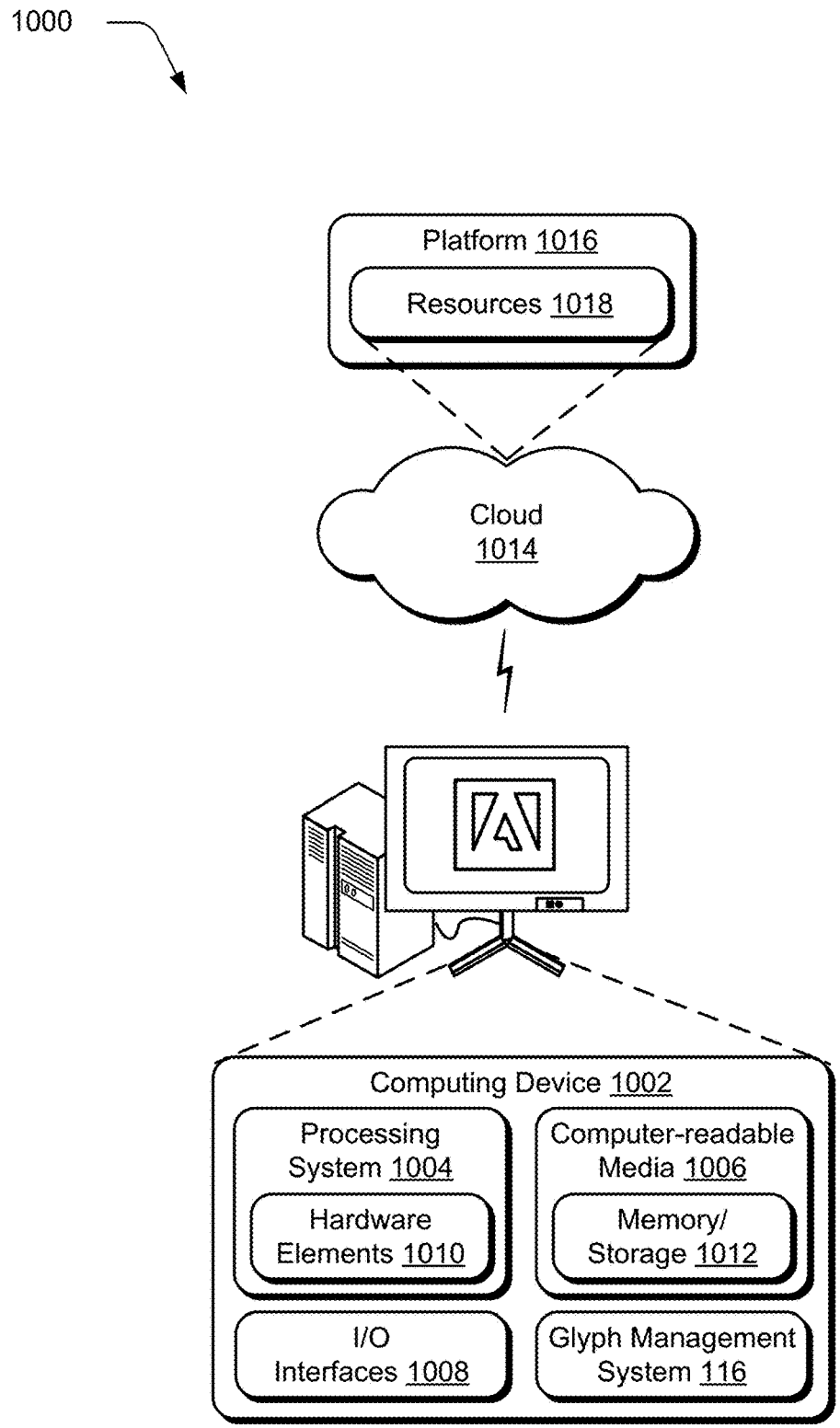
FIG. 10 illustrates an example system including various components of an example device that can be implemented as any type of computing device as described and/or utilize with reference to FIGS. 1-9 to implement embodiments of the techniques described herein.

FIG. 10 illustrates an example system generally at 1000 that includes an example computing device 1002 that is representative of one or more computing systems and/or devices that implement the various techniques described herein. This is illustrated through inclusion of the glyph management system 116. The computing device 1002 is configurable, for example, as a server of a service provider, a device associated with a client (e.g., a client device), an on-chip system, and/or any other suitable computing device or computing system.

The example computing device 1002 as illustrated includes a processing device 1004, one or more computer-readable media 1006, and one or more I/O interface 1008 that are communicatively coupled, one to another. Although not shown, the computing device 1002 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing device 1004 is representative of functionality to perform one or more operations using hardware. Accordingly, the processing device 1004 is illustrated as including hardware element 1010 that is configurable as processors, functional blocks, and so forth. This includes implementation in hardware as an application specific integrated circuit or other logic device formed using one or more semiconductors. The hardware elements 1010 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 1006 is illustrated as including memory/storage 1012 that stores instructions that are executable to cause the processing device 1004 to perform operations. The memory/storage 1012 represents memory/storage capacity associated with one or more computer-readable media. The memory/storage 1012 includes volatile media (such as random access memory (RAM)) and/or nonvolatile media (such as read only memory (ROM), Flash memory, optical disks, magnetic disks, and so forth). The memory/storage 1012 includes fixed media (e.g., RAM, ROM, a fixed hard drive, and so on) as well as removable media (e.g., Flash memory, a removable hard drive, an optical disc, and so forth). The computer-readable media 1006 is configurable in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 1002. By way of example, and not limitation, computer-readable media includes "computer-readable storage media" and "computer-readable signal media."

"Computer-readable storage media" refers to media and/or devices that enable persistent and/or non-transitory storage of information (e.g., instructions are stored thereon that are executable by a processing device) in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 1002, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 1010. The computing device 1002 is configured to implement particular instructions and/or functions corresponding to the software and/or hardware modules. Accordingly, implementation of a module that is executable by the computing device 1002 as software is achieved at least partially in hardware, e.g., through use of computer-readable storage media and/or hardware elements 1010 of the processing device 1004. The instructions and/or functions are executable/operable by one or more articles of manufacture (for example, one or more computing devices 1002 and/or processing devices 1004) to implement techniques, modules, and examples described herein.

The techniques described herein are supported by various configurations of the computing device 1002 and are not limited to the specific examples of the techniques described herein. This functionality is also implementable all or in part through use of a distributed system, such as over a "cloud" 1014 via a platform 1016 as described below.

The cloud 1014 includes and/or is representative of a platform 1016 for resources 1018. The platform 1016 abstracts underlying functionality of hardware (e.g., servers) and software resources of the cloud 1014. The resources 1018 include applications and/or data that can be utilized while computer processing is executed on servers that are remote from the computing device 1002. Resources 1018 can also include services provided over the Internet and/or through a subscriber network, such as a cellular or Wi-Fi network.

The platform 1016 abstracts resources and functions to connect the computing device 1002 with other computing devices. The platform 1016 also serves to abstract scaling of resources to provide a corresponding level of scale to encountered demand for the resources 1018 that are implemented via the platform 1016. Accordingly, in an interconnected device embodiment, implementation of functionality described herein is distributable throughout the system 1000. For example, the functionality is implementable in part on the computing device 1002 as well as via the platform 1016 that abstracts the functionality of the cloud 1014.

In implementations, the platform 1016 employs a "machine-learning model" that is configured to implement the techniques described herein. A machine-learning model refers to a computer representation that can be tuned (e.g., trained) based on inputs to approximate unknown functions. In particular, the term machine-learning model can include a model that utilizes algorithms to learn from, and make predictions on, known data by analyzing training data to learn to generate outputs that reflect patterns and attributes of the training data. Examples of machine-learning models include neural networks, convolutional neural networks (CNNs), long short-term memory (LSTM) neural networks, decision trees, and so forth.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
   detecting, by a processing device, a missing glyph is not included in a font to be used to render digital content in a user interface;
   generating, by the processing device, a plurality of glyph clusters in the font, each glyph cluster including a plurality of glyphs having a threshold level of similarity;
   locating, by the processing device, at least one replacement glyph in the font, the locating including:
     identifying a glyph cluster from the plurality of glyph clusters as corresponding to the missing glyph by comparing the missing glyph to a representative glyph that represents an average of glyphs of the glyph cluster;
     determining an amount of similarity of the missing glyph to glyphs of the glyph cluster based on a vector representation of the glyph cluster;
     selecting a glyph from the glyph cluster based on the amount of similarity;
     identifying an additional glyph cluster corresponding to an additional representative glyph with a threshold amount of similarity to the representative glyph;
     identifying a section of a glyph from the additional glyph cluster with a different amount of similarity to the missing glyph than a section of the glyph from the glyph cluster; and
     generating the at least one replacement glyph by combining the glyph from the glyph cluster with the section of the glyph from the additional glyph cluster; and
   displaying, by the processing device, the digital content and the at least one replacement glyph in the user interface.

2. The method as described in claim 1, wherein the detecting the missing glyph is performed responsive to a user input received via the user interface as identifying the missing glyph.

3. The method as described in claim 1, wherein the identifying is based on a Unicode identifier of the missing glyph and a Unicode identifier associated with the glyph cluster.

4. The method as described in claim 1, wherein the respective glyphs obtained based on the glyph cluster are included as part of the font.

5. The method as described in claim 1, further comprising verifying the glyph cluster from the plurality of glyph clusters corresponds to the missing glyph.

6. The method as described in claim 5, further comprising:
   responsive to a result of verifying that the representative glyph of the glyph cluster does not correspond to the missing glyph, determining an amount of similarity, respectively, of the missing glyph to other glyphs from the font;
   identifying another section of the other glyphs by comparing the amount of similarity to a similarity threshold, respectively; and
   displaying representations of the other section of the other glyphs in the user interface.

7. The method as described in claim 5, wherein the verifying includes generating the representative glyph from glyphs included in the glyph cluster and generating metadata comparing the representative glyph with the missing glyph.

8. The method as described in claim 7, wherein the generating the representative glyph from the glyphs included in the glyph cluster includes generating the representative glyph as an average representation of vector representations of the glyphs included in the glyph cluster.

9. The method as described in claim 7, wherein the verifying includes determining the missing glyph is similar to the representative glyph based on visual similarity.

10. The method as described in claim 9, wherein the visual similarity is defined using a similarity threshold.

11. The method as described in claim 1, wherein the plurality of glyph clusters is maintained in a cache after preprocessing of the font.

12. The method as described in claim 1, wherein the at least one replacement glyph is included in a plurality of replacement glyphs and further comprising ordering the plurality of replacement glyphs based on the amount of similarity to the missing glyph, respectively, and wherein the displaying is performed based at least in part on the ordering.

13. A system comprising:
a processing device; and
a computer-readable storage medium storing instructions that, responsive to execution by the processing device, causes the processing device to perform operations including:
generating a plurality of glyph clusters in a font, each glyph cluster including a plurality of glyphs having a threshold level of similarity;
identifying a glyph cluster from the plurality of glyph clusters as corresponding to a missing glyph included as part of text by comparing the missing glyph to a representative glyph that represents an average of glyphs of the glyph cluster;
determining an amount of similarity of the missing glyph to glyphs of the glyph cluster based on a vector representation of the glyph cluster;
selecting a glyph from the glyph cluster based on the amount of similarity;
identifying an additional glyph cluster corresponding to an additional representative glyph with a threshold amount of similarity to the representative glyph;
identifying a section of a glyph from the additional glyph cluster with a different amount of similarity to the missing glyph than a section of the glyph from the glyph cluster;
generating at least one replacement glyph by combining the glyph from the glyph cluster with the section of the glyph from the additional glyph cluster; and
displaying the at least one replacement glyph as part of the text in a user interface.

14. The system as described in claim 13, wherein the identifying is based on a Unicode identifier of the missing glyph and a Unicode identifier associated with the glyph cluster.

15. The system as described in claim 13, the operations further comprising verifying the glyph cluster from the plurality of glyph clusters corresponds to the missing glyph.

16. The system as described in claim 15, further comprising:
responsive to a result of verifying that the representative glyph of the glyph cluster does not correspond to the missing glyph, determining an amount of similarity, respectively, of the missing glyph to other glyphs from the font;
identifying another section of the other glyphs by comparing the amount of similarity to a similarity threshold, respectively; and
displaying representations of the other section of the other glyphs in the user interface.

17. The system as described in claim 15, wherein the verifying includes generating the representative glyph from glyphs included in the glyph cluster and generating metadata comparing the representative glyph with the missing glyph.

18. The system as described in claim 13, wherein the plurality of glyph clusters is maintained in a cache after preprocessing of the font.

19. A computer-readable storage medium storing instructions that, responsive to execution by a processing device, causes the processing device to perform operations including:
receiving an input causing a change in text from a first font to a second font;
detecting a missing glyph, the missing glyph included in the text and is not included in the second font;
generating a plurality of glyph clusters in the second font, each glyph cluster including a plurality of glyphs having a threshold level of similarity;
locating a replacement glyph in the second font, the locating including:
identifying a glyph cluster from the plurality of glyph clusters as corresponding to the missing glyph by comparing the missing glyph to a representative glyph that represents an average of glyphs of the glyph cluster;
determining an amount of similarity of the missing glyph to glyphs of the glyph cluster based on a vector representation of the glyph cluster;
selecting a glyph from the glyph cluster based on the amount of similarity;
identifying an additional glyph cluster corresponding to an additional representative glyph with a threshold amount of similarity to the representative glyph;
identifying a section of a glyph from the additional glyph cluster with a different amount of similarity to the missing glyph than a section of the glyph from the glyph cluster; and
generating at least one replacement glyph by combining the glyph from the glyph cluster with the section of the glyph from the additional glyph cluster; and
displaying the text and the replacement glyph in a user interface.

20. The computer-readable storage medium as described in claim 19, wherein the detecting is performed automatically and without user intervention.

* * * * *